United States Patent
Sugiyama et al.

(10) Patent No.: US 11,795,296 B2
(45) Date of Patent: Oct. 24, 2023

(54) PARTICULATE NUCLEATING AGENT, RESIN COMPOSITION, PRODUCTION METHOD THEREOF, AND MOLDED PRODUCT

(71) Applicant: ADEKA CORPORATION, Tokyo (JP)

(72) Inventors: Wataru Sugiyama, Saitama (JP); Yuri Yokota, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 17/613,689

(22) PCT Filed: Jan. 13, 2021

(86) PCT No.: PCT/JP2021/000817
§ 371 (c)(1),
(2) Date: Nov. 23, 2021

(87) PCT Pub. No.: WO2021/186862
PCT Pub. Date: Sep. 23, 2021

(65) Prior Publication Data
US 2022/0289941 A1    Sep. 15, 2022

(30) Foreign Application Priority Data
Mar. 16, 2020 (JP) ................................. 2020-045090

(51) Int. Cl.
| | |
|---|---|
| *C08K 5/00* | (2006.01) |
| *C08J 3/20* | (2006.01) |
| *C08J 3/28* | (2006.01) |
| *C08K 3/34* | (2006.01) |
| *C08K 5/17* | (2006.01) |

(52) U.S. Cl.
CPC ............. *C08K 5/0083* (2013.01); *C08J 3/203* (2013.01); *C08J 3/28* (2013.01); *C08K 3/34* (2013.01); *C08K 5/0091* (2013.01); *C08K 5/17* (2013.01); *C08J 2323/12* (2013.01)

(58) Field of Classification Search
CPC ...... C08K 5/0083; C08K 3/34; C08K 5/0091; C08K 5/17; C08J 3/203; C08J 3/28; C08J 2323/12
See application file for complete search history.

(56) References Cited

U.S. PATENT DOCUMENTS

| | | |
|---|---|---|
| 7,714,046 B2 | 5/2010 | Ishii et al. |
| 9,527,981 B2 | 12/2016 | Shimizu et al. |
| 10,131,751 B2 | 11/2018 | Lake, Jr. et al. |
| 10,882,974 B2 | 1/2021 | Fukuda et al. |
| 10,982,072 B2 | 4/2021 | Fukuda et al. |
| 10,988,596 B2 | 4/2021 | Le et al. |
| 2009/0156744 A1 | 6/2009 | Ishii et al. |
| 2013/0012630 A1 | 1/2013 | Shimizu et al. |
| 2014/0179846 A1 | 6/2014 | Lake, Jr. et al. |
| 2017/0088678 A1 | 3/2017 | Lake, Jr. et al. |
| 2018/0201759 A1 | 7/2018 | Le et al. |
| 2018/0208741 A1 | 7/2018 | Le et al. |
| 2020/0207950 A1 | 7/2020 | Fukuda et al. |
| 2020/0239664 A1 | 7/2020 | Fukuda et al. |
| 2021/0171732 A1 | 6/2021 | Le et al. |

FOREIGN PATENT DOCUMENTS

| | | | |
|---|---|---|---|
| JP | H11-310670 A | 11/1999 | |
| JP | 2011-213808 A | 10/2011 | |
| JP | 2017-149962 A | 8/2017 | |
| JP | 2018-520257 A | 7/2018 | |
| JP | 6423982 B1 * | 11/2018 | ................ C08J 3/12 |
| WO | WO 2007/039997 A1 | 4/2007 | |
| WO | WO 2019/220658 A1 | 11/2019 | |
| WO | WO 2020/008668 A1 | 1/2020 | |

OTHER PUBLICATIONS

ISR for PCT/JP2021/000817, dated Mar. 23, 2021.

* cited by examiner

*Primary Examiner* — Angela C Scott
(74) *Attorney, Agent, or Firm* — GREENBLUM & BERNSTEIN, P.L.C.

(57) ABSTRACT

A particulate nucleating agent of the present invention is a particulate nucleating agent that contains a compound represented by a predetermined general formula, in which a content of phosphate ions in the particulate nucleating agent, which is obtained by a predetermined measurement procedure, is equal to or more than 5 ppm and equal to or less than 8,000 ppm based on a mass of the compound represented by the predetermined general formula.

9 Claims, No Drawings

PARTICULATE NUCLEATING AGENT, RESIN COMPOSITION, PRODUCTION METHOD THEREOF, AND MOLDED PRODUCT

TECHNICAL FIELD

The present invention relates to a particulate nucleating agent, a resin composition, a production method thereof, and a molded product.

BACKGROUND ART

As a modification technique of a polymer material, a technique of adding a crystal nucleating agent or a crystallization accelerator is known. As such a kind of technique, a technique disclosed in Patent Document 1 is known, for example. Patent Document 1 discloses that a nucleating agent (hereinafter, a crystal nucleating agent, a crystallization accelerator, and a transparentizing agent are collectively referred to as "nucleating agent") is added to a polyolefin-based resin (claim 1 of Patent Document 1 and the like). In the document, a phosphoric acid ester salt is exemplified as a nucleating agent (paragraph 0014 of Citation 1).

RELATED DOCUMENT

Patent Document

[Patent Document 1] Japanese Unexamined Patent Publication No. 2017-149962

SUMMARY OF THE INVENTION

However, as a result of examination by the present inventors, in the nucleating agent described in Patent Document 1, it was determined that there was room for improvement in terms of feed reliability and color tone of the molded product obtained by molding a polyolefin-based resin when the nucleating agent is added to the polyolefin-based resin.

As a result of examination by the present inventors, the following finding was obtained.

A general particulate nucleating agent is added to a thermoplastic resin and melt-kneaded as a particulate body, and used in a heating and molding process of the thermoplastic resin. However, there was a concern that feed reliability would deteriorate due to the influence of various powder physical properties of the particulate nucleating agent. If feed reliability deteriorates, production reliability at the time of molding process deteriorates.

As a result of the examination considering such circumstances, it was found that it is possible to improve feed reliability by causing the particulate nucleating agent to contain phosphate ions. However, it was understood that in a case where an excessive amount of phosphate ions is contained in the particulate nucleating agent, when the particulate nucleating agent is added to the thermoplastic resin, additives other than the particulate nucleating agent contained in the polyolefin-based resin react with the phosphate ions, and as a result, the molded product obtained by molding the polyolefin-based resin was colored.

The present inventors further performed examination based on the finding and found that it is possible to enhance feed reliability and suppress coloring of the molded product obtained by molding the polyolefin-based resin when added to the polyolefin-based resin by setting a content of the phosphate ions in the particulate nucleating agent within an appropriate numerical value range, thereby completing the present invention.

According to the present invention, there is provided a particulate nucleating agent including at least one compound represented by the following General Formula (1), in which a content of phosphate ions in the particulate nucleating agent obtained by the following measurement procedure is equal to or more than 5 ppm and equal to or less than 8,000 ppm based on a mass of the compound represented by the following General Formula (1).

(Measurement Procedure)

1. The particulate nucleating agent is measured.
2. 100 parts by mass of xylene, 18 parts by mass of isopropyl alcohol, and 20 parts by mass of pure water with respect to 3 parts by mass of the compound represented by the General Formula (1) are added to the particulate nucleating agent to obtain a mixture solution in a container.
3. The obtained mixture solution is stirred at room temperature for 15 minutes while ultrasonic waves are applied.
4. Subsequently, the container is allowed to stand for 30 minutes to separate an organic layer and an aqueous layer.
5. The aqueous layer in the container is fractionated and water is distilled off completely.
6. 10 parts by mass of a 30 mmol/L potassium hydroxide aqueous solution with respect to 3 parts by mass of the compound represented by the General Formula (1) is added to a residue in the container, and stirred for 15 minutes while ultrasonic waves are applied.
7. Subsequently, the liquid in the container is filtered using a membrane filter having a pore size of 0.45 μm to obtain a filtrate, and then a concentration of the phosphate ions in the filtrate is quantified by ion chromatography.
8. On the basis of the concentration of the phosphate ions in the filtrate, a content of the phosphate ions (ppm) based on the mass of the compound represented by the General Formula (1) is calculated.

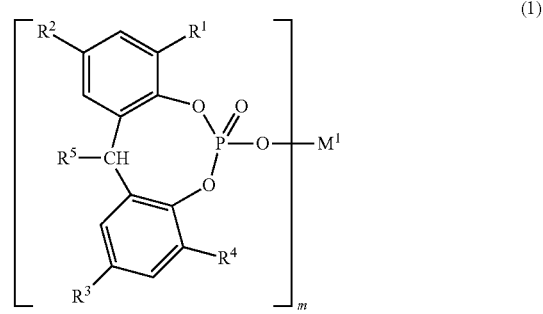

(In the General Formula (1), $R^1$ to $R^4$ each independently represent a hydrogen atom or a straight-chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, an alkali metal atom, or $Al(OH)_2$, and in a case where m is 2, $M^1$ represents an alkali earth metal atom, Al(OH), or Zn.)

In addition, according to the present invention, a resin composition obtained by causing the particulate nucleating agent to be contained in a polyolefin-based resin is provided.

In addition, according to the present invention, a method of producing a resin composition including adding the particulate nucleating agent to a polyolefin-based resin is provided.

In addition, according to the present invention, a molded product obtained by using the resin composition is provided.

According to the present invention, a particulate nucleating agent having excellent feed reliability and capable of sufficiently suppressing coloring of a molded product obtained by molding a polyolefin-based resin when added to a polyolefin-based resin, a resin composition using thereof, a method of producing thereof, and a molded product are provided.

DESCRIPTION OF EMBODIMENTS

A particulate nucleating agent of the present embodiment is described.

The particulate nucleating agent contains an aromatic phosphate ester metal salt. As the aromatic phosphate ester metal salt, a compound represented by the following General Formula (1) is used. The compound may be used alone, or two or more thereof may be used by being combined together.

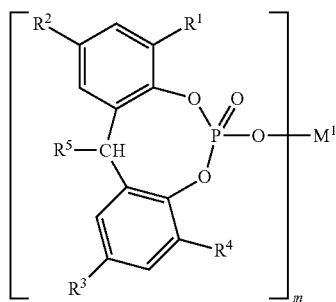

(1)

In the General Formula (1), $R^1$ to $R^4$ each independently represent a hydrogen atom or a straight-chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, an alkali metal atom, or $Al(OH)_2$, and in a case where m is 2, $M^1$ represents an alkali earth metal atom, $Al(OH)$, or Zn.

Examples of an alkyl group having 1 to 9 carbon atoms represented by $R^1$, $R^2$, $R^3$, and $R^4$ in the following General Formula (1) include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group, and a tert-heptyl group.

In the following General Formula (1), examples of an alkali metal atom represented by $M^1$ include sodium (Na), potassium (K), lithium (Li), and the like. Among these, sodium and lithium are preferable because the nucleating agent effect of the nucleating agent component is remarkable, and sodium is particularly preferable.

Examples of the alkali earth metal atom represented by $M^1$ in the General Formula (1) include beryllium (Be), magnesium (Mg), calcium (Ca), strontium (Sr), barium (Ba), and radium (Ra), and among these, magnesium and calcium are preferable since the nucleating agent effect of nucleating agent components is remarkable.

Among the compounds represented by the General Formula (1), a compound in which m is 1 is preferable. In addition, a compound in which $R^1$, $R^2$, $R^3$ and $R^4$ have one group selected from the group consisting of a methyl group, an ethyl group, a sec-butyl group and a tert-butyl group is preferable, a compound in which $R^1$, $R^2$, $R^3$ and $R^4$ have one group selected from the group consisting of a methyl group and a tert-butyl group is more preferable, and a compound in which $R^1$, $R^2$, $R^3$ and $R^4$ have a tert-butyl group is particularly preferable. In addition, a compound in which $R^5$ is a hydrogen atom or a methyl group is preferable, and a compound in which $R^5$ is a hydrogen atom is particularly preferable.

As the compound represented by the General Formula (1), one or two or more compounds represented by any of the Chemical Formulae (2) to (15) are preferably included. Among these, from a viewpoint of improving physical properties of the resin, the compound represented by any of the Chemical Formulae (2) to (8) is preferable, the compound represented by any of the Chemical Formulae (5) to (8) is more preferable, the compound represented by any of the Chemical Formulae (5) or (7) is further more preferable, and the compound represented by the Chemical Formula (5) is particularly preferable. From a viewpoint of improving transparency, the compound represented by any of the Chemical Formulae (9) to (15) is preferable, the compound represented by any of the Chemical Formulae (9) to (12) is more preferable, the compound represented by any of the Chemical Formulae (9) or (12) is further more preferable, and the compound represented by the Chemical Formula (12) is particularly preferable.

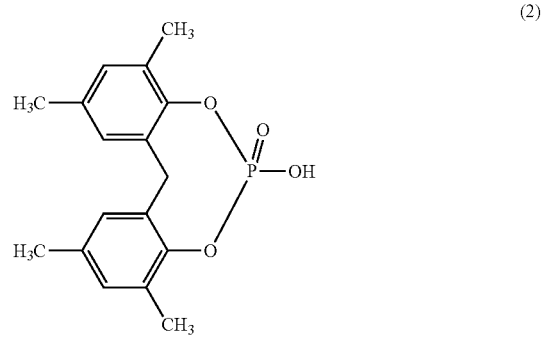

(2)

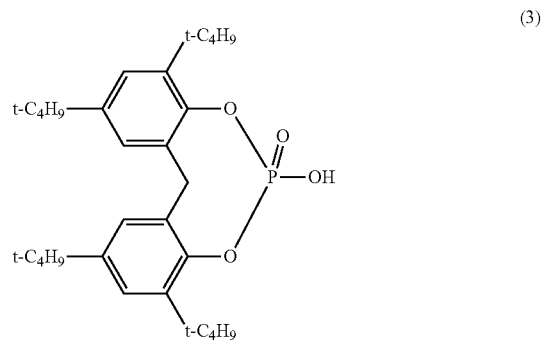

(3)

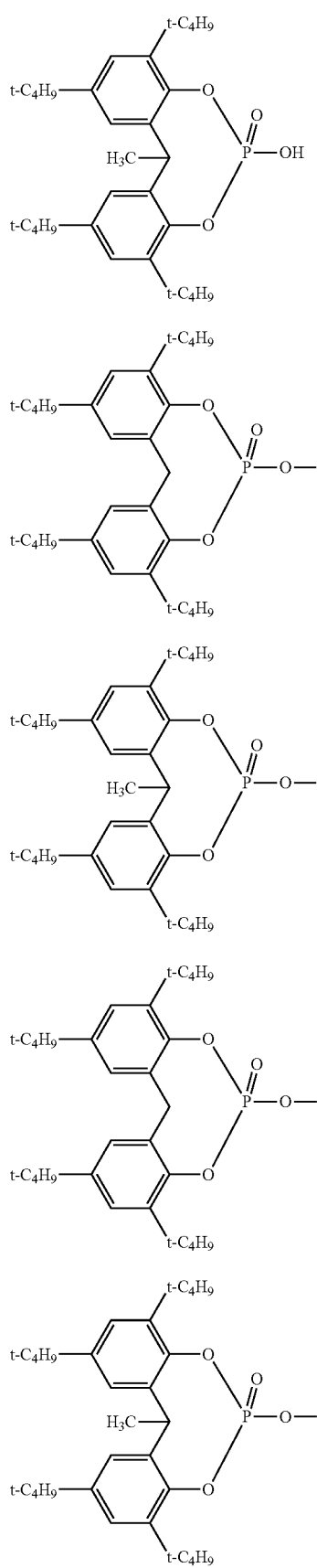
(4)
(5)
(6)
(7)
(8)
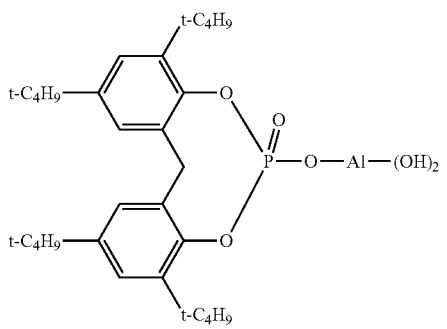
(9)
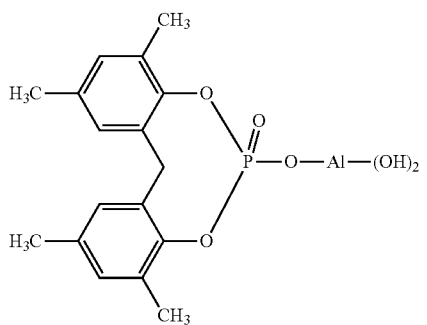
(10)
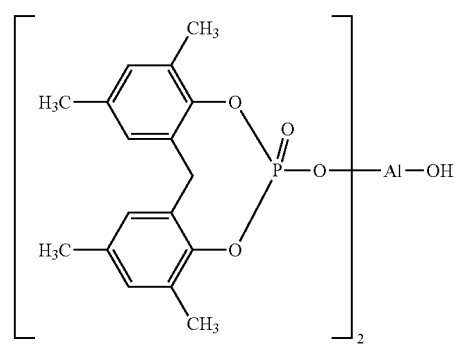
(11)
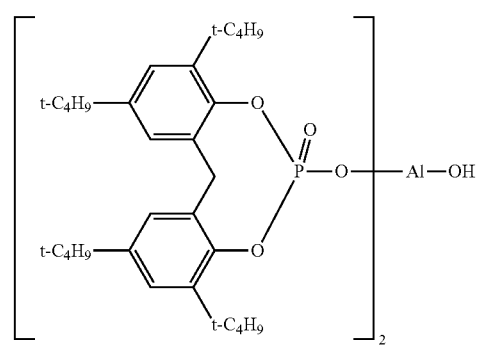
(12)

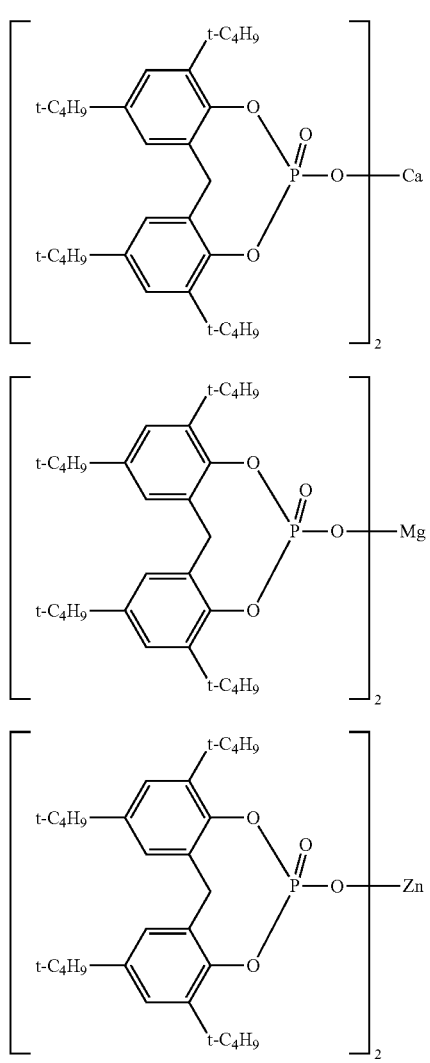

As a method of producing the compound represented by the General Formula (1), phosphorus trichloride (or phosphorus oxychloride) is reacted with 2,2'-alkylidene phenol, and then hydrolysis is performed depending on the necessity to produce a cyclic acid phosphate. Subsequently, the cyclic acid phosphate is reacted with a metal hydroxide such as sodium hydroxide and potassium hydroxide, and the obtained reactant is appropriately refined (filtered and the like) and dried to obtain the compound (aromatic phosphate ester metal salt). In addition, the aromatic phosphate ester metal salt may be synthesized by a known method in the related art and used as the compound.

In addition, the obtained compound is dissolved in a solvent, reacted with other metal hydroxides such as lithium hydroxide, or reacted with any salt of aluminum, zinc, and alkali earth metal atom, and the obtained reactant is refined and dried to obtain another compound.

A particulate nucleating agent of the present embodiment is obtained by pulverizing the obtained compound using appropriate pulverizing means, depending on the necessity. In the particulate nucleating agent, coarse particles may be removed by being sieved with a sieve of a predetermined mesh size. In addition, the particulate nucleating agent can include one or two or more powdery compounds. For example, two or more compounds having different particle diameter distribution, or classified two or more compounds may be combined and blended with one another at an appropriate proportion to obtain the particulate nucleating agent.

Examples of the pulverizing means include mortar, ball mill, rod mill, tube mill, conical mill, vibratory ball mill, Hyswing ball mill, roller mill, pin mill, hammermill, attrition mill, jet mill, jet miser, micronizer, nanomiser, majac mill, micro-atomizer, colloid mill, premier colloid mill, micron mill, Charlotte colloid mill, rotary cutter, dry medium stirring mill, and the like. These pulverizing machines can be used alone or two or more can be used in combination, and these machines are appropriately selected depending on the type of raw material powders to be pulverized, the pulverizing time, and the like.

The particulate nucleating agent of the present embodiment may be constituted of only the compound represented by the General Formula (1), or may contain other components within a range of achieving the object of the present invention. Examples of the other components include a nucleating agent other than the compound represented by the General Formula (1), a fatty acid metal salt, a silicic acid-based inorganic additive component, hydrotalcites, and the like. The compound may be used alone, or two or more thereof may be used by being combined together.

The particulate nucleating agent of the present embodiment preferably contains a fatty acid metal salt in addition to the compound represented by the General Formula (1). In this case, the dispersibility of the particulate nucleating agent in the polyolefin-based resin becomes excellent. In addition, the particulate nucleating agent of the present embodiment preferably contains a silicic acid-based inorganic additive component in addition to the compound represented by the General Formula (1). In this case, the nucleation action of the particulate nucleating agent becomes further excellent.

Examples of the nucleating agent other than the compound represented by the General Formula (1) include metal carboxylates such as sodium benzoate, 4-tert-butyl benzoate aluminum salt, sodium adipate and disodium bicyclo [2.2.1] heptane-2,3-dicarboxylate, and calcium cyclohexane 1,2-dicarboxylate, polyol derivatives such as dibenzylene sorbitol, bis(methylbenzylidene) sorbitol, bis(3,4-dimethylbenzylidene) sorbitol, bis(p-ethylbenzylene) sorbitol and bis (dimethylbenzylidene) sorbitol, 1,2,3-trideoxy-4,6: 5,7-o-bis(4-propylbenzylidene) nonitol, amide compounds such as N,N',N"-tris [2-methylcyclohexyl]-1,2,3-propanetricarboxamide, N,N',N"-tricyclohexyl-1,3,5-benzenetricarboxamide, N,N'-dicyclohexylnaphthalenedicarboxamide, 1,3,5-tri (dimethylisopropoylamino) benzene, and the like. Among these, metal carboxylates are particularly preferable. In addition, in metal carboxylates, sodium benzoate and 4-tert-butyl benzoate aluminum salt are preferable, and sodium benzoate is particularly preferable.

As the fatty acid metal salt, those containing a compound represented by the following General Formula (16) are preferable.

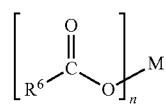

In the General Formula (16), $R^6$ represents a straight-chain or branched aliphatic group having 9 to 30 carbon atoms, M represents a metal atom, and n represents an integer of 1 to 4, which is an integer corresponding to the valence of metal atoms of M.

In the General Formula (16), $R^6$ is a straight-chain or branched aliphatic group having 9 to 30 carbon atoms, examples thereof include an alkyl group and an alkenyl group having 9 to 30 carbon atoms, and this may be substituted with a hydroxyl group.

Examples of fatty acids constituting the fatty acid metal salts include saturated fatty acids such as capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heicosylic acid, behenic acid, tricosylic acid, lignoceric acid, cerotic acid, montanoic acid, and melissic acid, straight-chain unsaturated fatty acids such as 4-decenoic acid, 4-dodecenoic acid, palmitoleic acid, α-linolenic acid, linoleic acid, T-linolenic acid, stearidonic acid, petroselinic acid, oleic acid, elaidic acid, vaccenic acid, eicosapentaenoic acid, docosapentaenoic acid, and docosahexaenoic acid, and the like.

In the fatty acid metal salt, an aliphatic group represented by $R^6$ preferably has 10 to 21 carbon atoms. As the fatty acid constituting the fatty acid metal salt, lauric acid, myristic acid, palmitic acid, stearic acid, behenic acid, oleic acid, and 12-hydroxy stearic acid are particularly preferable.

Examples of the metal atom represented by M include alkali metal, magnesium, calcium, strontium, barium, titanium, manganese, iron, zinc, silicon, zirconium, yttrium, barium, hafnium, and the like. Among these, alkali metal such as sodium, lithium, and potassium is preferable, sodium and lithium are more preferable, and in particular, lithium is preferably used since the crystallization temperature thereof is high.

Examples of the silicic acid-based inorganic additive components include fumed silica, fine particulate silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like, and among these, those of which particle structure is a layer-like structure and those of which silicon content is 15% by mass or more are preferable. Examples of preferable inorganic additive thereof include sericite, kaolinite, talc, mica, minnesotite, pyrophyllite, and the like, talc and mica are more preferable, and talc is particularly preferable.

The hydrotalcites may be natural products or synthetic products, and can be used regardless of presence or absence of surface treatment or presence or absence of water of crystallization. Examples of the hydrotalcites include basic carbonate represented by the following General Formula.

$$M_xMg_yAl_zCO_3(OH)_{xp+2y+3z-2} \cdot nH_2O$$

In the General Formula, M represents alkali metal or zinc, X represents a number of 0 to 6, y represents a number of 0 to 6, z represents a number of 0.1 to 4, p represents the valence of M, and n represents a number of 0 to 100 of water of crystallization.

The particulate nucleating agent containing other components is a particulate nucleating agent composition containing the compound represented by the General Formula (1), and is obtained by being constituted to contain one or more selected from the group consisting of other aromatic phosphate ester metal salts, fatty acid metal salts, silicic acid-based inorganic additive components, and hydrotalcites, preferably one or more selected from the group consisting of fatty acid metal salts, talc, mica, and hydrotalcites.

Such a particulate nucleating agent is obtained by performing pulverization treatment by appropriately combining the pulverizing means in the co-presence of the compound represented by the General Formula (1) and other components, for example. In addition, the pulverizing means, sieving, blending method, and the like can be used.

The particulate nucleating agent of the present embodiment functions as nucleation agent and transparentizing agent added during molding process of a polyolefin-based resin, and can realize improvement (modification effect) such as crystallization temperature, heat denaturation temperature, flexural modulus, hardness, transparency, and the like. In addition, it is possible to enhance molding cycle properties and to improve productivity.

The particulate nucleating agent of the present embodiment is obtained by the following measurement procedure, and has a characteristic that a content of phosphate ions ($PO_4^{3-}$) in the particulate nucleating agent is equal to or more than 5 ppm and 8,000 ppm based on a mass of the compound represented by the General Formula (1).

(Measurement Procedure)

1. The particulate nucleating agent is measured.

2. 100 parts by mass of xylene, 18 parts by mass of isopropyl alcohol, and 20 g parts by mass of pure water with respect to 3 parts by mass of the compound represented by the General formula (1) are added to the particulate nucleating agent to obtain a mixture solution in a container.

3. The obtained mixture solution is stirred at room temperature for 15 minutes while ultrasonic waves are applied.

4. Subsequently, the container is allowed to stand for 30 minutes to separate an organic layer and an aqueous layer.

5. The aqueous layer in the container is fractionated and water is distilled off completely.

6. 10 parts by mass of a 30 mmol/L potassium hydroxide aqueous solution with respect to 3 parts by mass of the compound represented by the General Formula (1) is added to a residue in the container, and stirred for 15 minutes while ultrasonic waves are applied.

7. Subsequently, the liquid in the container is filtered using a membrane filter having a pore size of 0.45 μm to obtain a filtrate, and then a concentration of phosphate ions ($PO_4^{3-}$) in the filtrate is quantified by ion chromatography.

8. On the basis of the concentration of phosphate ions in the filtrate, a content of the phosphate ions (ppm) based on the mass of the compound represented by the General Formula (1) is calculated.

The content of the compound represented by the General Formula (1) in the particulate nucleating agent may be calculated from a use amount of the compound represented by the General Formula (1) when producing the particulate nucleating agent, and can be determined by a method of analyzing an organic component in the particulate nucleating agent by a known method such as HPLC and GC, analyzing an inorganic component by a known method such as ICP emission analysis, and combining the analysis result of the organic component and the analysis result of the inorganic component and the like.

In Measurement Procedure 1, an amount of the particulate nucleating agent to be measured may be appropriately determined according to the content of the compound represented by the General Formula (1) in the particulate nucleating agent, and for example, in a case where the content of the compound represented by the General Formula (1) in 1 g of the particulate nucleating agent is A (g), the amount of the particulate nucleating agent to be measured may be 2×A (g) to 4×A (g).

In addition, in Measurement Procedure 3, in a case where insoluble matter is present after stirring the mixture solution, the insoluble matter may be removed by a method such as filtration.

According to the findings of the present inventors, it was found that by using the content of phosphate ions in the particulate nucleating agent as a guideline, both the feed reliability of the particulate nucleating agent and the color tone of the molded product obtained by molding the polyolefin-based resin to which the particulate nucleating agent is added can be appropriately controlled. That is, it became apparent that by setting the content of the phosphate ions to a predetermined value or more, the feed reliability of the particulate nucleating agent can be enhanced, and by setting the content of the phosphate ions to a predetermined value or less, the coloration of the molded product obtained by molding the polyolefin-based resin when adding the particulate nucleating agent to the polyolefin-based resin can be suppressed.

By enhancing the feed reliability of the particulate nucleating agent, it is possible to improve production reliability of the molding process of resin using the particulate nucleating agent. With this, it is expected that an allowable range of a powder physical properties of the particulate nucleating agent is widened in application to the molding process or use in nucleating agent and transparentizing agent.

In addition, by realizing a particulate nucleating agent capable of sufficiently suppressing the coloring of the molded product obtained by molding the polyolefin-based resin when adding the particulate nucleating agent to the polyolefin-based resin, a molded product having an excellent color tone can be realized.

In the present embodiment, a lower limit value of the content of the phosphate ions is equal to or more than 5 ppm, preferably equal to or more than 10 ppm, and further more preferably equal to or more than 15 ppm, based on the mass of the compound represented by of the General Formula (1). With this, it is possible to enhance feed reliability of the particulate nucleating agent.

The upper limit value of the content of the phosphate ions is equal to or less than 8,000 ppm, preferably equal to or less than 1,000 ppm, more preferably equal to or less than 500 ppm, further more preferably equal to or less than 200 ppm, and even further more preferably equal to or less than 100 ppm, based on a mass of the compound represented by the General Formula (1). As a result, when adding the particulate nucleating agent to the thermoplastic resin, the coloring of the molded product obtained by molding the thermoplastic resin can be suppressed.

In the present embodiment, it is possible to control the content of the phosphate ions by appropriately selecting the kind or the blending amount of each component contained in the particulate nucleating agent, synthesis and preparation method of the particulate nucleating agent, and the like, for example. Among these, for example, using trisodium anhydride phosphate in filtration, washing, refining steps, pulverization, classification, and blending steps, and a preparation step of a particulate nucleating agent, and the like are exemplified as an element to set the content of the phosphate ions within a desired numerical value range.

The particulate nucleating agent may contain an aliphatic amine.

The aliphatic amine is a compound in which one to three hydrogen atoms of ammonia are substituted with a hydrocarbon group. A part of the hydrocarbon group may be substituted with an oxygen atom and the like. Examples of the hydrocarbon group include an alkyl group and an alcoholic hydroxy group.

The aliphatic amine may be any one of primary amine, secondary amine, and tertiary amine.

The number of carbon atoms of the hydrocarbon group in the aliphatic amine is 1 to 6, preferably 2 to 5, and more preferably 2 to 4, for example. It is possible to improve the feed reliability by selecting the appropriate carbon atoms.

As the aliphatic amine, for example, aliphatic primary amines such as methylamine, ethylamine, propylamine, isopropylamine, butylamine, isobutylamine, tert-butylamine, amylamine, hexylamine, palmitylamine, ethylenediamine, and monoethanolamine; aliphatic secondary amines such as dimethylamine, diethylamine, dipropylamine, dibutylamine, diamylamine, and diethanolamine; aliphatic tertiary amines such as trimethylamine, triethylamine, tripropylamine, tributylamine, triamylamine, N,N-dimethylamine, and the like are used. Among these, from a viewpoint of production reliability of the particulate nucleating agent, one or more aliphatic amines selected from the group consisting of triethylamine, diethylamine, butylamine, and ethanolamine is preferable.

A resin composition of the present embodiment is a resin composition containing the particulate nucleating agent in a polyolefin-based resin.

A method of adding the particulate nucleating agent to the polyolefin-based resin is not particularly limited, and a generally used method can be applied as it is. For example, it is possible to use a method of dry blending a powder product or pellet of the polyolefin-based resin and a powder product of the particulate nucleating agent together.

The resin composition can be used in various forms. For example, the form may be any of pellet form, granule form, and powder form. From a viewpoint of handleability, the pellet form is preferable.

Examples of the polyolefin-based resin include α-olefin polymer such as polypropylene, high-density polyethylene, low-density polyethylene, straight-chain low-density polyethylene, polybutene-1, poly3-methylpentene, poly4-methylpentene, an ethylene/propylene block, and a random copolymer, and the like.

In addition, the resin composition of the present embodiment may contain a rubber component such as isoprene rubber, butadiene rubber, and thermoplastic elastomer.

The resin composition of the present embodiment preferably contains a polypropylene-based resin in which the use effect of the particulate nucleating agent of the present embodiment is remarkably exhibited. Examples of the polypropylene-based resin include polypropylene, an ethylene/propylene block or a random copolymer, α-olefin/propylene block other than ethylene, a random copolymer, and the like.

The polypropylene-based resin can be used regardless of the extreme viscosity, the isometactic pentad fraction, the density, the molecular weight distribution, the melt flow rate, the rigidity, and the like. For example, the polypropylene-based resin can be also appropriately used as disclosed in Japanese Unexamined Patent Publication No. 63-37148, Japanese Unexamined Patent Publication No. 63-37152, Japanese Unexamined Patent Publication No. 63-90552, Japanese Unexamined Patent Publication No. 63-210152, Japanese Unexamined Patent Publication No. 63-213547, Japanese Unexamined Patent Publication No. 63-243150, Japanese Unexamined Patent Publication No. 63-243152, Japanese Unexamined Patent Publication No. 63-260943, Japanese Unexamined Patent Publication No. 63-260944, Japanese Unexamined Patent Publication No. 63-264650, Japanese Unexamined Patent Publication No. 1-178541, Japanese Unexamined Patent Publication No. 2-49047, Japanese Unexamined Patent Publication No. 2-102242, Japanese Unexamined Patent Publication No. 2-251548, Japanese Unexamined Patent Publication No. 2-279746, Japanese Unexamined Patent Publication No. 3-195751, and the like.

A content of the particulate nucleating agent can be generally within a range of 0.001 to 10 parts by weight, preferably 0.005 to 8 parts by weight, and more preferably 0.01 to 5 parts by weight, with respect to 100 parts by weight of the polyolefin-based resin. As a result, the effect of modifying the polyolefin-based resin can be sufficiently obtained.

The resin composition of the present embodiment can contain an additive such as anti-oxidant, photostabilizer, ultraviolet absorbing agent, pigment, filler, plasticizer, epoxy compound, foaming agent, anti-static agent, flame retardant, lubricant, heavy metal inert agent, hydrotalcites, organocarboxylic acid, coloring agent, silicic acid-based additive, and processing aid. The compound may be used alone, or two or more thereof may be used by being combined together.

Examples of the anti-oxidant include a phosphorus-based anti-oxidant, a phenol-based anti-oxidant, a thioether-based anti-oxidant, and the like.

Examples of the anti-static agent include a low molecular weight anti-static agent containing a cationic surfactant, an anionic surfactant, a nonionic surfactant, an amphoteric surfactant, and the like and a high molecular weight anti-static agent containing a block polymer having ionomer or polyethylene glycol as a hydrophilic portion, and the like.

Examples of the flame retardant include a halogen-based compound, a phosphate ester compound, a phosphate amid compound, a melamine-based compound, a melamine salt compound of polyphosphate, a fluorine resin, a metal oxide, and the like.

Examples of the lubricant include a hydrocarbon-based lubricant, a fatty acid-based lubricant, an aliphatic alcohol-based lubricant, an aliphatic ester-based lubricant, an aliphatic amide-based lubricant, a metal soap-based lubricant, and the like.

Examples of the silicic acid-based additive include fumed silica, fine particulate silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like.

A content of the additive in the resin composition is preferably 0.001 to 10 parts by weight, for example, with respect to 100 parts by weight of a polyolefin-based resin. By setting the content of the additive to be within such a numerical value range, the effect of the additive is improved.

The resin composition can be used in a molded product such as injection molded product, fiber, flat yarn, biaxially stretched film, uniaxially stretched film, non-stretched film, sheet, thermoformed product, extrusion blow-molded product, injection blow-molded product, injection stretching blow-molded product, profile extrusion-molded product, rotationally molded product, and the like. Among these, the injection molded product, the film, the sheet, and the thermoformed product are preferable as the molded product.

The method of producing the molded product of the present embodiment includes a step of molding a resin composition based on various molding methods. With this, it is possible to obtain the molded product.

The molding method is not particularly limited, and examples thereof include an injection molding method, an extrusion molding method, a blow molding method, a rotational molding method, a vacuum molding method, an inflation molding method, a calender molding method, a slush molding method, a dip molding method, a foaming molding method, and the like. Among these, the injection molding method, the extrusion molding method, and the blow molding method are preferable.

The resin composition can be used for various uses such as construction materials, agricultural materials, components for vehicles such as automobiles, trains, ships, aircrafts, and the like, packaging materials, miscellaneous goods, toys, home appliances, medical supplies, and the like. Specifically, examples thereof include automobile components such as bumper, dashboard, instrument panel, battery case, luggage case, door panel, door trim, fender liner, and the like; resin components for home appliances such as refrigerator, washing machine, vacuum cleaner, and the like; household goods such as tableware, bottle cap, bucket, bathing article, and the like; resin components for connection such as connector and the like; miscellaneous goods such as toys, storage containers, synthetic paper, and the like; medical molded products such as medical pack, syringe, catheter, medical tube, syringe preparation, infusion solution bag, reagent container, medicine container, medicine unit packaging, and the like; building materials such as wall material, floor material, window frame, wall paper, window, and the like; wire coating materials; agricultural materials such as house, tunnel, flat yarn mesh bag, and the like; industrial materials such as pallet, pail can, backgrind tape, tape for liquid crystal protection, pipe, modified silicone polymer for sealing material, and the like; food packaging materials such as wrap, tray, cup, film, bottle, cap, preservation container, and the like; other 3D printer materials, separator film for battery, and the like. In addition, the resin composition can be used in uses in a case where various post-treatments are performed, for example, uses in a case where sterilization by radiation is performed such as medical use and food packaging use, uses in a case where low-temperature plasma treatment and the like are performed after molding in order to improve surface properties such as coating properties, or the like. Among these, the resin composition is preferably used in automobile components, household goods, and food packaging materials.

EXAMPLES

Hereinafter, the present invention will be described in detail with reference to examples. However, the present invention is not limited to the descriptions of the examples.

<Synthesis of Compound>

(Particulate Nucleating Agent 1)

42.5 g of 2,2'-methylene bis[4,6-bis(1,1-dimethylethyl)] phenol, 16.1 g of phosphorus oxychloride, and 2.4 g of triethylamine were put and stirred at 50° C. for 3 hours. Subsequently, an aqueous solution of 4 g of sodium hydroxide and methanol were put and stirred at room temperature for 1 hour to obtain a slurry. The obtained slurry was filtered and the filtrate was washed with water to obtain a white solid. To the obtained white solid, 500 mL of pure water and 50 mg of a dispersant (ADEKA COL EC-8600 manufactured by ADEKA CORPORATION) were added, and the mixture was stirred at room temperature for 1 hour to obtain a slurry. The obtained slurry was filtered and the filtrate was washed with water to obtain a white solid. The obtained white solid was dried under reduced pressure to obtain 42.1 g of white particulate product represented by Compound No. 1. The white particulate product was denoted as a particulate nucleating agent 1.

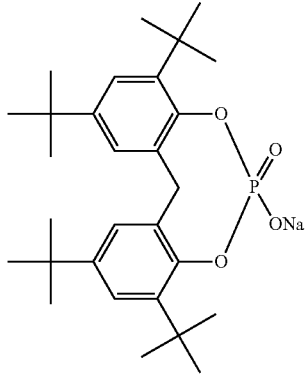

Compound No. 1

(Particulate Nucleating Agent 2)

25.4 g (0.05 mol) of white powders obtained in <Synthesis of Compound No. 1> was dissolved in methanol, an aqueous solution of 1.2 g (0.05 mol) of lithium hydroxide was added thereto, and the resultant product was stirred at room temperature for 1 hour to obtain a slurry. The obtained slurry was filtered, and the filtrate was washed with water until the pH reached 8 to obtain a white solid. The obtained white solid was dried under reduced pressure and then pulverized with a dry medium stirring mill to obtain 20.5 g of a white particulate product represented by Compound No. 2. This white particulate product was denoted as a particulate nucleating agent 2.

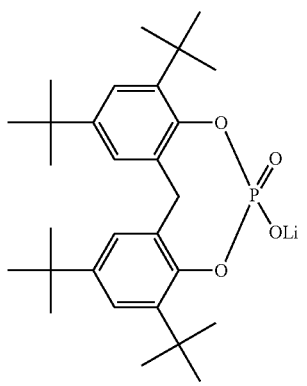

Compound No. 2

(Particulate Nucleating Agent 3)

10.2 g (0.02 mol) of white powders obtained in <Synthesis of Compound No. 1> was dissolved in methanol, and an aqueous solution of 2.41 g (0.01 mol) of aluminum sulfate was dropped while stirring at 40° C. After completion of the dropping, the reaction mixture was heated and stirred under reflux with methanol for 4 hours. After the heating and stirring were completed, the reaction mixture was cooled to room temperature to obtain a slurry. The obtained slurry was filtered, and the filtrate was repeatedly washed with water to obtain a white solid. The obtained white solid was dried under reduced pressure and then pulverized with a pin mill to obtain 9.63 g of a white particulate product represented by Compound No. 3. This white particulate product was denoted as a particulate nucleating agent 3.

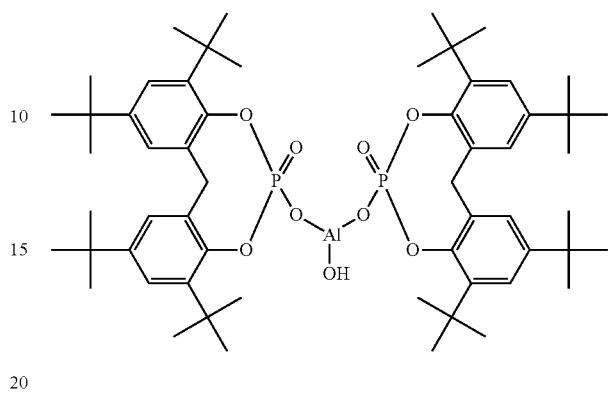

Compound No. 3

(Particulate Nucleating Agent 4)

135 g of a particulate nucleating agent 1 and 15 g of a particulate nucleating agent 2 were uniformly mixed to obtain 150 g of a particulate nucleating agent 4.

(Particulate Nucleating Agent 5)

135 g of a particulate nucleating agent 1 and 15 g of sodium benzoate (product name ORGATER MI.NA.08 manufactured by ADEKA POLYMER ADDITVES EUROPE) were uniformly mixed to obtain 150 g of a particulate nucleating agent 4.

(Particulate Nucleating Agent 6)

135 g of a particulate nucleating agent 1 and 15 g of lithium myristate were uniformly mixed to obtain 150 g of a particulate nucleating agent 4.

(Particulate Nucleating Agent 7)

135 g of a particulate nucleating agent 1 and 15 g of talc (product name: MICRO ACE P-4 manufactured by Nippon Talc Co., Ltd.) were uniformly mixed to obtain 150 g of a particulate nucleating agent 4.

Examples 1 to 16, Comparative Examples 1 to 2

To the obtained particulate nucleating agents 1 to 7, a predetermined amount of trisodium anhydride phosphate was added to obtain particulate nucleating agents of Examples 4 to 16 and Comparative Example 2 having the content of phosphate ions shown in Table 1. Then, by mixing a predetermined amount of the particulate nucleating agent 1 and the particulate nucleating agent of Example 4, the particulate nucleating agents of Examples 1 to 3 and Comparative Example 1 having the content of phosphate ions shown in Table 1.

The content of phosphate ions ($PO_4^{3-}$) in the particulate nucleating agents of Examples 1-16 and Comparative Examples 1 and 2 was obtained by the following measurement procedure.

<Measurement of Content of Phosphate Ions>

1. As a sample, the obtained particulate nucleating agent was measured in a 250 mL plastic bottle. Here, the measured amount of the particulate nucleating agent was set so that the charged amount of the compound represented by the General Formula (1) was 3 g.

2. 100 g of xylene, 18 g of isopropyl alcohol, and 20 g of pure water were added to a plastic bottle to obtain a mixture solution in a container.

3. The obtained mixture solution was stirred at room temperature for 15 minutes while ultrasonic waves are applied, the mixture solution was filtered, and only the filtrate was returned to the container.

4. The container was allowed to stand for 30 minutes to separate the organic layer and the aqueous layer.

5. The aqueous layer in the container was fractionated and transferred to a 500 mL eggplant flask, and the water was completely distilled off using a rotary evaporator.

6. After adding 10 mL of a 30 mmol/L potassium hydroxide aqueous solution to the residue in the 500 mL eggplant flask, the eggplant flask was closed tightly with a ball stopper and stirred for 15 minutes while ultrasonic waves are applied.

7. The liquid in the 500 mL eggplant flask was filtered using a membrane filter having a pore size of 0.45 μm to obtain a filtrate, and then a concentration of phosphate ions in the filtrate was quantified by ion chromatography based on the following measurement conditions. The kind of phosphate ions as the measurement target was $PO_4^{3-}$. The concentration (ppm) of phosphate ions was measured using three measurement targets, and an average value of three measurement values was obtained.

8. On the basis of the concentration of phosphate ions in the filtrate, a content (ppm) of the phosphate ions based on the mass of the compound represented by the General Formula (1) was calculated.

(Measurement Condition)

Measurement device: Ion chromatograph ICS-2100 (manufactured by Thermofischer Scientific Co., Ltd.)

Column: Dionex IonPac AS19 (manufactured by Thermofischer Scientific Co., Ltd.)

Detector: Electrical conductivity detector

Elution condition: 1.0 mmol/L of potassium hydroxide aqueous solution (0 minute)→60.0 mmol/L of potassium hydroxide aqueous solution (35 minutes). The concentration of the potassium hydroxide aqueous solution was changed as follows.

From 0 minute to 1 minute: Gradient from 1.0 mmol/L to 10.0 mmol/L.

From more than 1 minute to 10 minutes: Constant at 10.0 mmol/L.

From more than 10 minutes to 15 minutes: Gradient from 10.0 mmol/L to 60.0 mmol/L.

From more than 15 minutes to 35 minutes: Constant at 60.0 mmol/L.

Flow rate: 1.0 mL/min

Sample injection amount: 25 μL

Column temperature: 35° C.

The contents of phosphate ions of the particulate nucleating agents 1 to 7 measured based on the <Measurement of Content of Phosphate ions> were all less than 0.5 ppm.

TABLE 1

|  | Comparative Example 1 | Example 1 | Example 2 | Example 3 | Example 4 | Example 5 | Example 6 | Example 7 | Example 8 |
|---|---|---|---|---|---|---|---|---|---|
| Particulate nucleating agent | 1 | 1 | 1 | 1 | 1 | 2 | 3 | 1 | 1 |
| Content of phosphate ions (×1000 ppm) | 0.0007 | 0.005 | 0.02 | 0.05 | 0.1 | 0.1 | 0.1 | 0.2 | 0.5 |
| Discharge time (s) | 56 | 23 | 20 | 20 | 19 | 20 | 18 | 20 | 21 |
| Heat coloring amount ΔT (%) | <0.1 | 0.1 | 0.1 | 0.1 | 0.1 | 0.1 | 0.3 | 0.2 | 0.2 |
| Feed reliability | X | ◯ | ◯ | ◯ | ◯ | ◯ | ◯ | ◯ | ◯ |
| Coloring degree of molded product | ◯ | ◯ | ◯ | ◯ | ◯ | ◯ | ◯ | ◯ | ◯ |

|  | Example 9 | Example 10 | Example 11 | Example 12 | Example 13 | Example 14 | Example 15 | Example 16 | Comparative Example 2 |
|---|---|---|---|---|---|---|---|---|---|
| Particulate nucleating agent | 1 | 1 | 1 | 1 | 4 | 5 | 6 | 7 | 1 |
| Content of phosphate ions (×1000 ppm) | 1 | 2 | 5 | 8 | 0.05 | 0.02 | 0.02 | 0.02 | 10 |
| Discharge time (s) | 20 | 18 | 20 | 18 | 22 | 21 | 23 | 22 | 21 |
| Heat coloring amount ΔT (%) | 0.3 | 0.4 | 0.5 | 0.5 | 0.1 | 0.1 | 0.1 | 0.1 | 2.1 |
| Feed reliability | ◯ | ◯ | ◯ | ◯ | ◯ | ◯ | ◯ | ◯ | ◯ |
| Coloring degree of molded product | ◯ | ◯ | ◯ | ◯ | ◯ | ◯ | ◯ | ◯ | X |

Particulate nucleating agents of Examples and Comparative Examples were evaluated based on the following evaluation items.

<Feed Reliability>

Using a powder property evaluation device (Multi-tester MT-02 manufactured by Seishin Enterprise Co., Ltd.), the obtained particulate nucleating agent was filled in a feeder of the powder property evaluation device by 10 g, and a discharge time at the time of vibration was measured under a condition of feeder vibration width of 1.0 mm. Each particulate nucleating agent was measured using three samples, and an average value of three measurement values was set as a discharge time t (s) and used as an index of feed reliability. The result is shown in Table 1. The pass and fail criteria for feed reliability are as follows.

Pass: t is equal to or less than 30 s

Fail: t is more than 30 s

<Coloring Degree of Molded Product>

A heat coloring amount ΔT was calculated by the following method and used as an index for evaluating a coloring degree of the molded product obtained by molding a thermoplastic resin when the particulate nucleating agent was added to the polyolefin-based resin.

1 g of the obtained particulate nucleating agent and 1 g of a phenol-based antioxidant (ADEKA STUB AO-60 manufactured by ADEKA CORPORATION) were measured and mixed while being ground using a mortar.

1 g of the obtained mixture was measured, transferred to a glass test tube, and heated in an air atmosphere at 230° C. for 5 minutes using a block bath.

The heated mixture was allowed to cool to room temperature, 5 mL of a solvent was added, and the mixture was stirred for 15 minutes while adding ultrasonic waves. A solvent was further added to the solution after allowing to cool to obtain a 10 mL solution, and then the solution was filtered to obtain a filtrate. This filtrate was used as a test solution.

Here, the following solvent was used as the solvent.

Particulate nucleating agents 1 and 4 to 7, Examples 1 to 4 and 7 to 16, Comparative Examples 1 and 2: mixed solvent of methanol/toluene=1/4 (mass ratio)

Particulate nucleating agent 2, Example 5: mixed solvent of methanol/toluene=1/1 (mass ratio)

Particulate nucleating agent 3, Example 6: toluene

The obtained test solution was filtered using a membrane filter having a pore size of 0.45 μm, and then the transmittance (%) at a wavelength of 450 mn was measured using an ultraviolet visible spectrophotometer (V-750 manufactured by JASCO Corporation).

ΔT (%) was calculated from the following formula and evaluated based on the following evaluation criteria. The measurement results of ΔT are shown in Table 1.

Regarding Examples 1 to 4, 7 to 12, and Comparative Examples 1 and 2

The formula of a heat coloring amount: ΔT (%)=transmittance (%) of each sample solution at a wavelength of 450 nm−transmittance (%) of the sample solution of particulate nucleating agent 1 at a wavelength of 450 nm Regarding Example 5

The formula of a heat coloring amount: ΔT (%)=transmittance (%) of the sample solution at a wavelength of 450 nm−transmittance (%) of the sample solution of the particulate nucleating agent 2 at a wavelength of 450 nm Regarding Example 6

The formula of a heat coloring amount: ΔT (%)=transmittance (%) of the sample solution at a wavelength of 450 nm−transmittance (%) of the sample solution of the particulate nucleating agent 3 at a wavelength of 450 nm Regarding Example 13

The formula of a heat coloring amount: ΔT (%)=transmittance (%) of the sample solution at a wavelength of 450 nm−transmittance (%) of the sample solution of the particulate nucleating agent 4 at a wavelength of 450 nm Regarding Example 14

The formula of a heat coloring amount: ΔT (%)=transmittance (%) of the sample solution at a wavelength of 450 nm−transmittance (%) of the sample solution of the particulate nucleating agent 5 at a wavelength of 450 nm Regarding Example 15

The formula of a heat coloring amount: ΔT (%)=transmittance (%) of the sample solution at a wavelength of 450 nm−transmittance (%) of the sample solution of the particulate nucleating agent 6 at a wavelength of 450 nm Regarding Example 16

The formula of a heat coloring amount: ΔT (%)=transmittance (%) of the sample solution at a wavelength of 450 nm−transmittance (%) of the sample solution of the particulate nucleating agent 7 at a wavelength of 450 nm The pass and fail criteria for the degree of coloring of the molded product obtained by molding the polyolefin-based resin when the particulate nucleating agent was added to the polyolefin-based resin were as follows.

Pass: ΔT is equal to or less than 1.0%
Fail: ΔT is more than 1.0%

<Transparentizing Properties>

A composition obtained by mixing 0.1 parts by weight of the obtained particulate nucleating agent of each example with 100 parts by weight of polypropylene using a Henschel mixer for 1 minute, and extrusion processed under a condition of 230° C. and 150 rpm to produce a pellet. Haze (haze value: %) of a test piece having a thickness of 1 mm obtained by injection molding the resultant product at 200° C. was measured based on JIS K7136.

The particulate nucleating agents of Examples 1 to 16 were excellent in feed reliability as compared with the particulate nucleating agent of Comparative Example 1. In addition, the particulate nucleating agents of Examples 1 to 16 have a sufficiently smaller heat coloring amount ΔT than the particulate nucleating agent of Comparative Example 2, and it was found that when the particulate nucleating agents of Examples 1 to 16 are added to the polyolefin-based resin, it was found that the coloring of the molded product obtained by molding the thermoplastic resin can be sufficiently suppressed.

In addition, the particulate nucleating agents of Examples 1 to 16 had a small haze value within a range in which there was no problem in practical use.

Such particulate nucleating agents of the examples can improve transparency of a polyolefin-based resin. Therefore, it was found that the particulate nucleating agent can be suitably used as nucleating agent and transparentizing agent.

Priority is claimed on Japanese Patent Application No. 2020-045090, filed on Mar. 16, 2020, the content of which is incorporated herein by reference.

The invention claimed is:

1. A particulate nucleating agent comprising:
at least one compound represented by the following General Formula (1), and $PO_4^{3-}$ ions;
wherein the particulate nucleating agent is structured such that a content of $PO_4^{3-}$ ions that results from subjecting the particulate nucleating agent to the following measurement procedure is equal to or more than 5 ppm and equal to or less than 8,000 ppm based on a mass of the compound represented by the following General Formula (1),
1. the particulate nucleating agent is measured,
2. 100 parts by mass of xylene, 18 parts by mass of isopropyl alcohol, and 20 parts by mass of pure water with respect to 3 parts by mass of the compound represented by the General Formula (1) are added to the particulate nucleating agent to obtain a mixture solution in a container, 3. The obtained mixture solution is stirred at room temperature for 15 minutes while ultrasonic waves are applied,
4. Subsequently, the container is allowed to stand for 30 minutes to separate an organic layer and an aqueous layer,
5. The aqueous layer in the container is fractionated and water is distilled off completely,
6. 10 parts by mass of a 30 mmol/L potassium hydroxide aqueous solution with respect to 3 parts by mass of the compound represented by the General Formula (1) is added to a residue in the container, and stirred for 15 minutes while ultrasonic waves are applied,
7. Subsequently, the liquid in the container is filtered using a membrane filter having a pore size of 0.45 μm to obtain a filtrate, and then a concentration of the $PO_4^{3-}$ ions in the filtrate is quantified by ion chromatography,
8. On the basis of the concentration of the $PO_4^{3-}$ ions in the filtrate, a content of the $PO_4^{3-}$ ions (ppm) based on the mass of the compound represented by the General Formula (1) is calculated,

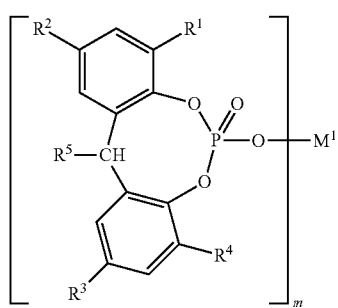
(1)

in the General Formula (1), $R^1$ to $R^4$ each independently represent a hydrogen atom or a straight-chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, an alkali metal atom, or $Al(OH)_2$, and in a case where m is 2, $M^1$ represents an alkali earth metal atom, Al(OH), or Zn.

2. The particulate nucleating agent according to claim 1, wherein the compound contains one or two or more compounds represented by the following Chemical Formulae (2) to (15)

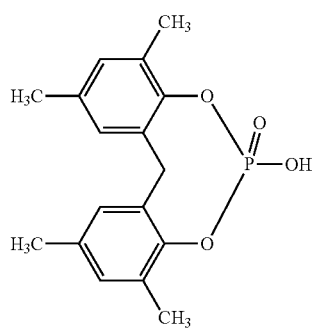
(2)

-continued

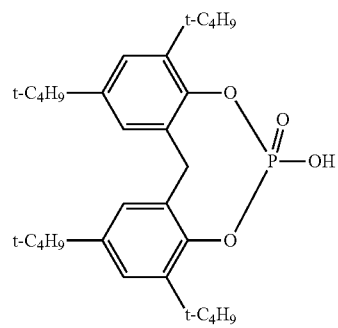
(3)

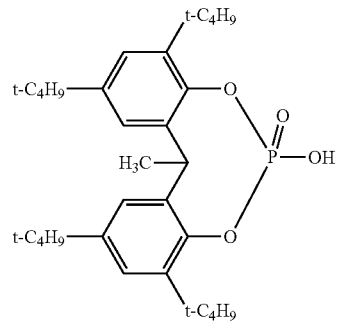
(4)

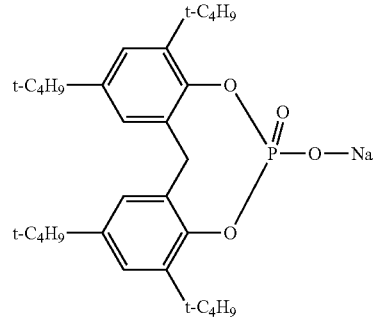
(5)

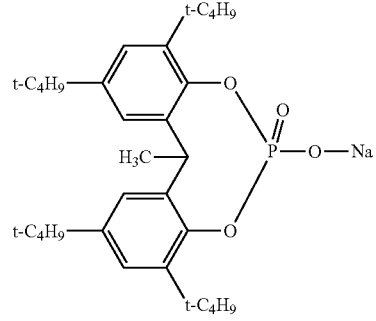
(6)

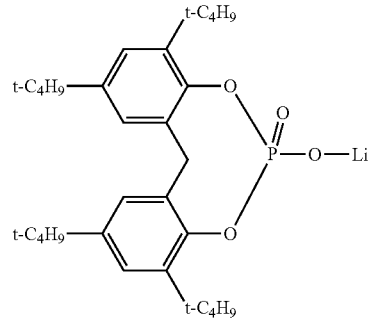
(7)

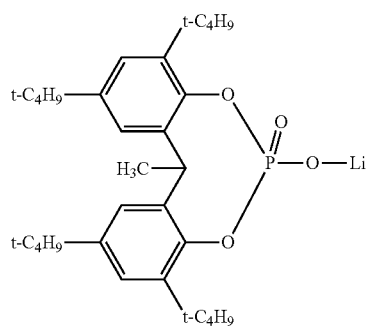
(8)

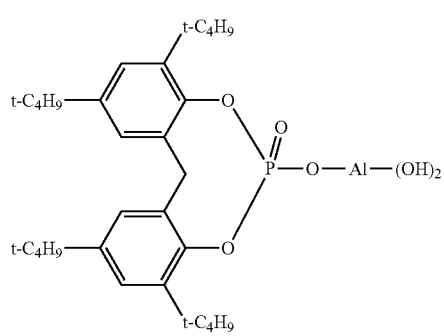
(9)

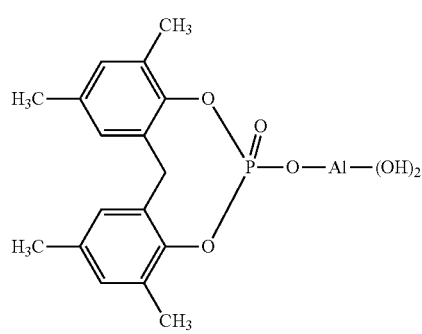
(10)

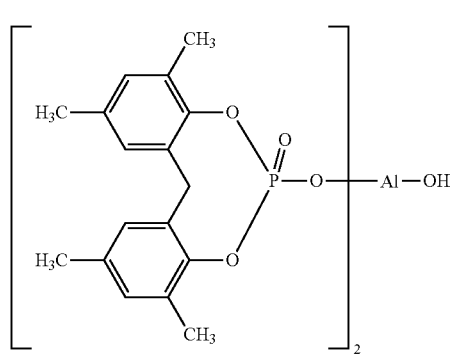
(11)

(12)

(13)

(14)

(15)

3. The particulate nucleating agent according to claim 1, comprising:
an aliphatic amine.

4. The particulate nucleating agent according to claim 1, further comprising:
at least one selected from the group consisting of a nucleating agent other than the compound represented by the General Formula (1), a fatty acid metal salt, and a silicic acid-based inorganic additive component.

5. A resin composition comprising:
a polyolefin-based resin containing the particulate nucleating agent according to claim 1.

6. The resin composition according to claim 5,
wherein the polyolefin-based resin contains a polypropylene-based resin.

7. The resin composition according to claim 5,
wherein a content of the particulate nucleating agent is equal to or more than 0.001 parts by weight and equal to or less than 10 parts by weight with respect to 100 parts by weight of the polyolefin-based resin.

8. A method of producing a resin composition, comprising:
adding the particulate nucleating agent according to claim 1 to a polyolefin-based resin.

9. A molded product obtained by using the resin composition according to claim 5.

* * * * *